United States Patent

Watkins et al.

[11] Patent Number: 5,746,852
[45] Date of Patent: May 5, 1998

[54] MOTORCYCLE RADIAL TIRE WITH RUBBER MEMBER BETWEEN CARCASS PLIES

[75] Inventors: David Robert Watkins; Nigel Gerard Nock, both of Sutton Coldfield; Michael Jackson, Birmingham, all of England

[73] Assignee: Sumitomo Rubber Industries Limited, Hyogo, Japan

[21] Appl. No.: 530,888

[22] Filed: Sep. 20, 1995

[30] Foreign Application Priority Data

Sep. 21, 1994 [GB] United Kingdom ............... 9418963

[51] Int. Cl.$^6$ ................ B60C 3/04; B60C 9/02; B60C 9/14; B60C 15/00
[52] U.S. Cl. ................ 152/454; 152/539; 152/541; 152/546; 152/547; 152/548; 152/549; 152/552; 152/553; 152/555
[58] Field of Search ................ 152/549, 541, 152/546, 532, 539, 555, 560, 559, 553, 552, 548, 454, 547

[56] References Cited

U.S. PATENT DOCUMENTS

| | | | |
|---|---|---|---|
| 3,929,539 | 12/1975 | Montagne. | |
| 4,215,735 | 8/1980 | Sato | 152/532 X |
| 4,284,116 | 8/1981 | Sato et al. | 152/549 X |
| 4,640,329 | 2/1987 | Nakasaki et al. | 152/541 X |
| 4,986,326 | 1/1991 | Watkins et al. | 152/541 X |

FOREIGN PATENT DOCUMENTS

| | | |
|---|---|---|
| 0240195 | 10/1987 | European Pat. Off. . |
| 0547849 | 6/1993 | European Pat. Off. . |
| 3242323 | 6/1983 | Germany . |
| 58-93606 | 6/1983 | Japan ................ 152/549 |
| A72198 | 8/1975 | Luxembourg . |

OTHER PUBLICATIONS

Patent Abstracts of Japan, vol. 010, No. 100 (M–470), (Apr. 16, 1986), JP–A–60 234009 (Sumitomo Gomu Kogyo KK), (Nov. 20, 1985), Abstract.

*Primary Examiner*—Adrienne C. Johnstone

[57] ABSTRACT

A motorcycle tire comprises a tread reinforced between its edges by a breaker assembly and having in its normally inflated fitted condition a camber value C/L of between 0.5 to 0.7, a reinforcing carcass ply of rubber covered cords radially inside the breaker assembly and extending between two bead regions and wrapped in each bead region around an annular bead core to form carcass ply turn-ups, and tire sidewalls between the tread edges and bead regions, wherein under the tread is disposed radially inward of the breaker assembly a secondary carcass ply of rubber covered cords and between the carcass ply and the secondary carcass ply is disposed a rubber member extending from tread edge to tread edge.

9 Claims, 1 Drawing Sheet

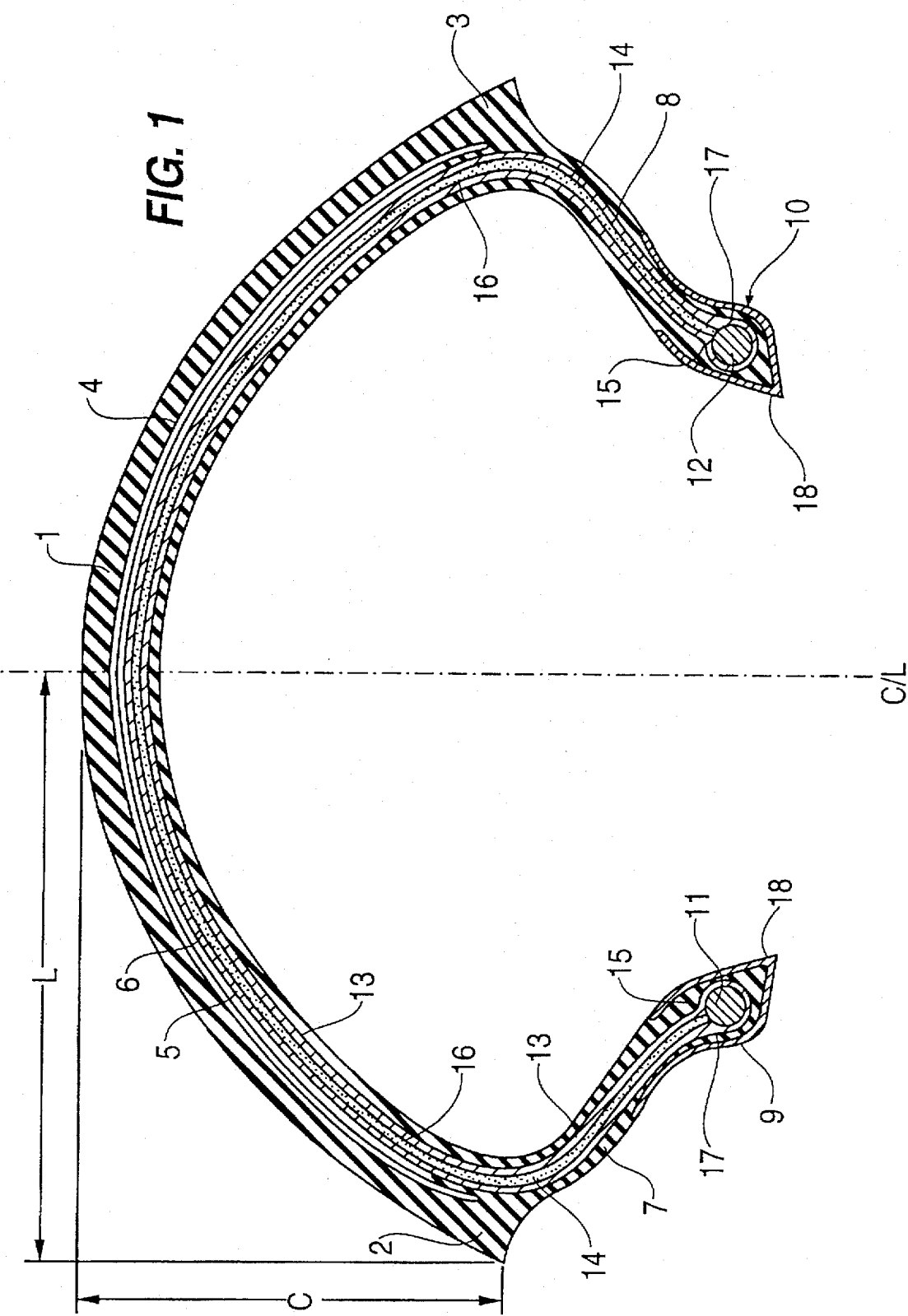

MOTORCYCLE RADIAL TIRE WITH RUBBER MEMBER BETWEEN CARCASS PLIES

This invention relates to motorcycle tires and in particular but not exclusively to high performance or race motorcycle tires.

BACKGROUND OF THE INVENTION

Such tires utilize very wide treads which in transverse cross-section are sharply curved to provide good contact with the road surface when the motorcycle is steeply banked in cornering. Maintenance of a consistent ground contact area of 'tire footprint' under all conditions is a major problem in determining general vehicle handling. Of particular importance in race motorcycle tires is the provision of high cornering power with good stability to maximize cornering speeds under race conditions and the maintenance of tire shape and footprint under conditions of heavy braking.

Present motorcycle race tires have short sidewalls which extend to the tread edges radially and axially outwardly from the tire beads. The beads provide engagement to the wheel-rim on tapered bead seats. The sidewalls are reinforced by a carcass ply or plies which when tensioned by the inflation pressure act together with sidewall geometry to provide location of the curved tread regions to withstand cornering forces.

The sharply curved tread region of the tire is specially reinforced by a reinforcing breaker to give the required structural rigidity to allow for banking over of the motorcycle when cornering while giving sufficient flexibility to allow localized tread flattening in the ground contact patch for good road grip.

Co-pending UK Patent Application No 9403230.7 describes a radial motorcycle tire in which the tread region is further reinforced by a sub-breaker ply comprising nylon reinforced material positioned radially between the carcass ply and the breaker. While this construction has been found to improve cornering power and grip, it has been found not fully effective in preventing tire collapse under severe braking.

SUMMARY OF THE INVENTION

An object of the present invention is to improve the braking properties of such motorcycle tires.

According to one aspect of the present invention a motorcycle tire comprises a tread reinforced between its edges by a breaker assembly and having in its normally inflated fitted condition a camber value C/L of between 0.5 and 0.7, a reinforcing carcass ply of rubber covered cords radially inside the breaker assembly and extending between two bead regions and wrapped in each bead region around an annular bead core to form carcass ply turn-ups, and tire sidewalls between the tread edges and bead regions, wherein under the tread is disposed radially inward of the breaker assembly a secondary carcass ply of rubber covered cords and between the carcass ply and the secondary carcass ply is disposed a rubber member extending from tread edge to tread edge.

By camber value is meant the ratio C/L between the radial distance C from the center to the edge of the tire tread and the axial distance L between the center and edge of the tread.

Preferably the rubber member and the secondary carcass ply extend through the sidewalls into the bead regions.

Also preferably the cords in the carcass and secondary carcass plies are organic fiber cords such as nylon cords and are inclined at an angle of between 50° and 90° to the tire circumferential direction. Also preferably, they are crossed with respect to each other.

Preferably the rubber member has a hardness in the range of 55–75 Shore A measured at 21° C. and a substantially constant cross-sectional thickness in the range 0.4 to 1.6 mm.

BRIEF DESCRIPTION OF THE DRAWING

Further aspects of the present invention will become apparent from the description of the following embodiments in conjunction with the attached diagrammatic drawing in which:

FIG. 1 shows in cross-section a motorcycle tire intended for high speed racing.

DETAILED DESCRIPTION OF THE INVENTION

The tire of FIG. 1 comprises a pair of sidewalls 7 and 8 terminating in bead regions 9 and 10. Each bead region is reinforced by an inextensible annular bead core 11 and 12. Extending between each bead region is a tire carcass reinforcement ply 13 which is anchored in each bead region by being turned around the respective bead core 11,12 laterally from the inside to the outside to form a ply turn-up 17. The carcass reinforcement ply 13 comprises one ply of tire fabric comprising rubber covered nylon cords of 2/94 TEX laid with the cords at between 50° and 90° to the tire circumferential direction. While the embodiment here comprises one carcass ply it may comprise multiple plies.

The tire has a camber value of 0.6 and comprises a convex tread region 1, having tread edges 2,3 reinforced by a breaker assembly 4. The breaker assembly comprises two breaker plies each of which comprises Kevlar (Registered Trade Mark) aramid cord tire fabric each of 2/165 TEX. The cords in each of the breaker plies are oppositely inclined to each other at an angle of between 18°–30° and preferably 25° to the circumferential direction of the tire. The radially inner breaker ply is narrower than the radially outer breaker ply.

Radially inside and immediately adjacent to the two breaker plies of the breaker 4 is a secondary carcass ply 5 comprising rubber covered nylon cords of 2/94 TEX. The cords of the secondary carcass ply 5 are laid at an angle between 50° and 90° to the circumferential direction of the tire and cross, i.e. are oppositely inclined to, the cords of the carcass ply 13. The secondary carcass ply 5 extends from the tread into each bead region 9,10 to overlap the turn-up portion 17 of the carcass ply.

Both the carcass ply 13 and the secondary carcass ply 5 have a rubber covering of 0.09 mm thickness over the nylon reinforcing cords.

Disposed abuttingly between the carcass ply 13 and the secondary carcass ply 5 is a rubber member 6 comprising cured rubber of hardness 65 Shore A measured at 21° C. The rubber member 6 extends from the tread to the bead region to about the bead cores 11 and 12, and is of a substantially constant thickness of 0.65 mm throughout its width. It is to be noted that the tire has no tapered rubber apex member incorporated in the bead region.

The resultant tires have been found to not only have improved cornering power, damping and grip but also to be stable and effectively resist collapse under severe braking.

The invention being thus described, it will be obvious that the same may be varied in many ways Such variations are not to be regarded as a departure from the spirit and scope of the invention, and all such modifications as would be obvious to one skilled in the art are intended to be included within the scope of the following claims.

We claim:

1. A motorcycle tire comprising a tread reinforced between its edges by a breaker assembly and having in its normally inflated fitted condition a camber value C/L being a ratio between the radial distance C from the center to the edge of the tread and the axial distance L between the center and the edge of the tread of between 0.5 to 0.7, a reinforcing carcass ply of rubber covered cords radially inside the breaker assembly and extending between two bead regions and wrapped in each bead region around an annular bead core to form carcass ply turn-ups, and tire sidewalls between the tread edges and bead regions, wherein under the tread is disposed radially inward of the breaker assembly and radially outwardly of the carcass ply a secondary carcass ply of rubber covered cords and between the carcass ply and the secondary carcass ply is disposed a rubber member extending from tread edge to tread edge, the rubber member having a substantially constant cross-sectional thickness between 0.4 and 1.6 mm, wherein the rubber member continues from the tread edges to the respective bead region, the secondary carcass ply extends from the tread to each bead region, the rubber member extends from the bead core in each bead region.

2. The motorcycle tire according to claim 1, wherein the cords of the carcass ply are organic fiber cords.

3. The motorcycle tire according to claim 2, wherein the cords of the carcass ply are nylon cords.

4. The motorcycle tire according to claim 1, wherein the cords of the secondary carcass ply are organic fiber cords.

5. The motorcycle tire according to claim 4, wherein the cords of the secondary carcass ply are nylon cords.

6. The motorcycle tire according to claim 1, wherein the rubber member has a hardness in the range 55–75 Shore A at 21° C.

7. The motorcycle tire according to claim 1, wherein in each bead region the secondary carcass ply overlaps the carcass ply turn-up axially outwardly thereof.

8. The motorcycle tire according to claim 1, wherein the cords of the carcass ply are disposed at an angle of between 50° and 90° to the circumferential direction of the tire.

9. The motorcycle tire according to claim 1, wherein the cords of the secondary carcass ply are disposed at an angle of between 50° and 90° to the circumferential direction of the tire.

* * * * *